June 28, 1966     W. A. SPEARS     3,257,838
WHEEL ALIGNMENT RACK

Filed Nov. 8, 1963     4 Sheets-Sheet 1

INVENTOR.
WILBURN A. SPEARS,
BY
McMorrow, Berman & Davidson
ATTORNEYS.

June 28, 1966 W. A. SPEARS 3,257,838
WHEEL ALIGNMENT RACK
Filed Nov. 8, 1963 4 Sheets-Sheet 2

INVENTOR.
WILBURN A. SPEARS,
BY
McMorrow, Berman & Davidson
ATTORNEYS.

June 28, 1966  W. A. SPEARS  3,257,838
WHEEL ALIGNMENT RACK
Filed Nov. 8, 1963  4 Sheets-Sheet 3
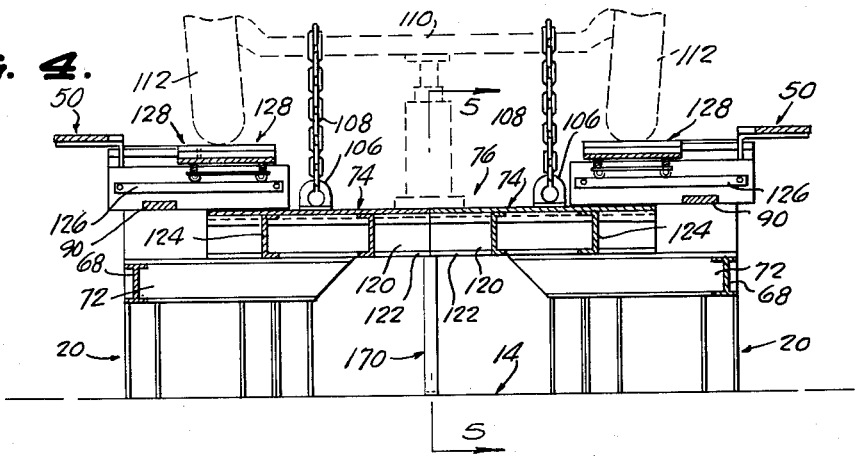
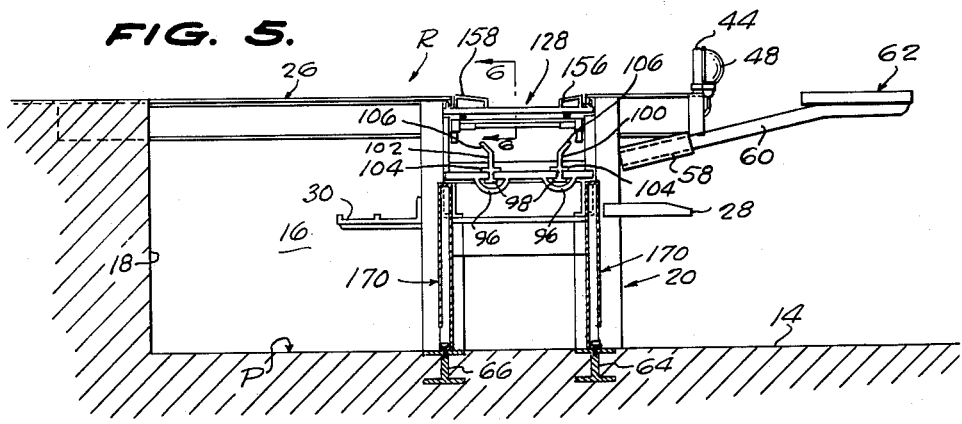
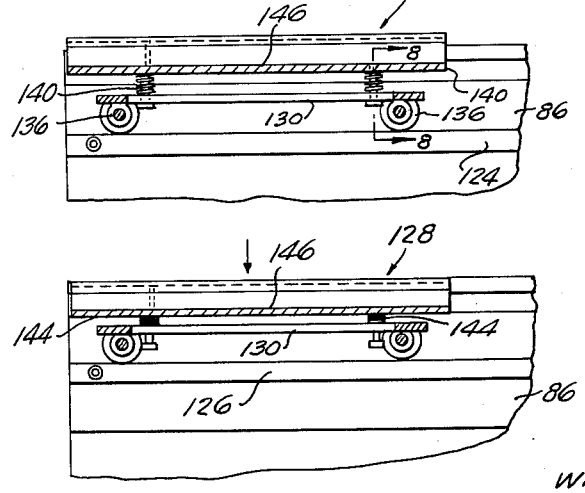
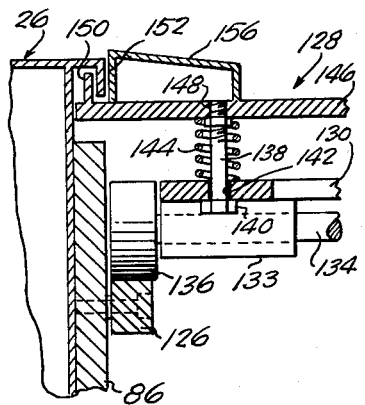
INVENTOR.
WILBURN A. SPEARS,
BY
McMorrow, Berman & Davidson
ATTORNEYS.

June 28, 1966  W. A. SPEARS  3,257,838
WHEEL ALIGNMENT RACK
Filed Nov. 8, 1963  4 Sheets-Sheet 4
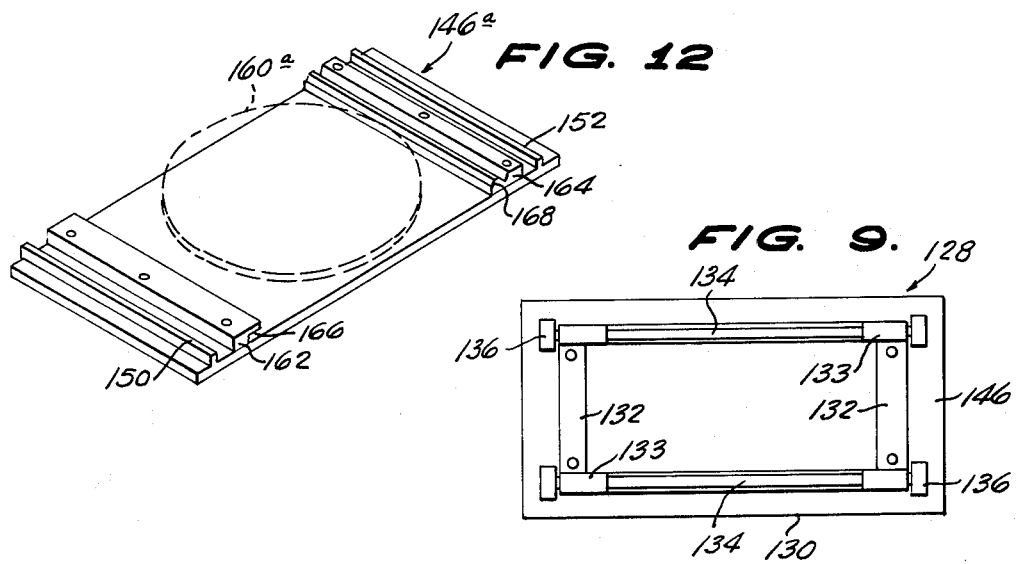
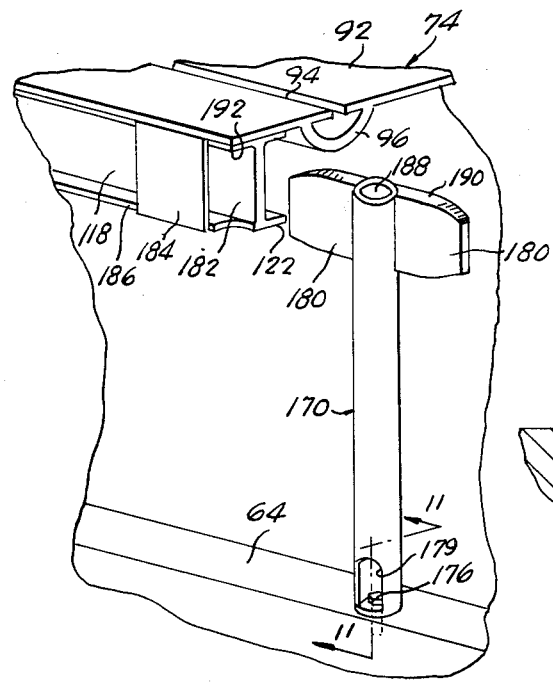
INVENTOR.
WILBURN A. SPEARS,
BY
McMorrow, Berman + Davidson
ATTORNEYS.

United States Patent Office 3,257,838
Patented June 28, 1966

3,257,838
WHEEL ALIGNMENT RACK
Wilburn A. Spears, Rte. 3, Box 84, Plain Dealing, La.
Filed Nov. 8, 1963, Ser. No. 322,294
7 Claims. (Cl. 72—446)

This invention relates to a novel alignment rack for checking and correcting the front wheels of automobile vehicles, and the running gear thereof.

The primary object of the invention is the provision, in a rack of the character indicated above of a press beam which is composed of two similar sections, which are movable, crosswise of related runways, to out-of-the-way storage positions beneath the runways, when not in use, but will still even then accommodate their most-frequently needed purpose, so as to afford complete freedom of the worker to pass, in both directions, between the runways and under a vehicle on the rack; and which, when wanted for use, are adapted to be individually moved inwardly toward each other, to a limited degree, or until they meet, and in the latter situation are supported by removable support means.

Another object of the invention is the provision of a more compact, more easily used, time and labor saving rack of the kind indicated, which has stationary runways, and gauge carriages which are movable, relative to the runways, to accommodate front wheels of different spacings or tread widths.

A further object of the invention is the provision, in press beam sections of the character indicated above, of opposed pairs of longitudinal adjustable anchors, for chains applied, in corrective operations, to the axle or other front end components of a vehicle, and the provision of areas for supporting hydraulic or other jacks, used in elevating a vehicle for inspection, correction of front suspension parts of said vehicle, or other purposes, each of the press beam sections being provided, on their inner sides, with convenient tool trays.

A still further object of the invention is the provision of a rack of the character indicated above, which is equipped with both fixed and removable accessories, which facilitate and speed up various operations involved in front-end inspections and corrections.

Other important objects and advantageous features of the invention will be apparent from the following description and the accompanying drawings, wherein, for purposes of illustration only, a specific form of the invention is set forth in detail.

In the drawings:

FIGURE 4 is a view like FIGURE 3, showing the press beam sections brought together and joint support means thereunder, and showing chains secured to their chain anchors and applied over the front axle of a vehicle, indicated in phantom lines;

FIGURE 5 is a vertical longitudinal section, taken on the line 5—5 of FIGURE 4, showing the front platform in place;

FIGURE 6 is an enlarged fragmentary transverse vertical section, taken on the line 6—6 of FIGURE 5, showing a gauge carriage in uncompressed condition;

FIGURE 7 is a view like FIGURE 6, showing the carriage as compressed by a vehicle front wheel thereon;

FIGURE 8 is an enlarged fragmentary vertical longitudinal section taken on the line 8—8 of FIGURE 6;

FIGURE 9 is a bottom plan view of a gauge carriage;

FIGURE 10 is an enlarged fragmentary perspective view showing the support for the press beam sections, as they are brought together;

FIGURE 11 is an enlarged fragmentary transverse section taken on the line 11 of FIGURE 10; and FIGURE 12 is a top perspective view of the top plate of another form of gauge carriage, the rotary turntable of such a gauge being shown positioned thereon in phantom lines.

Figure 1:
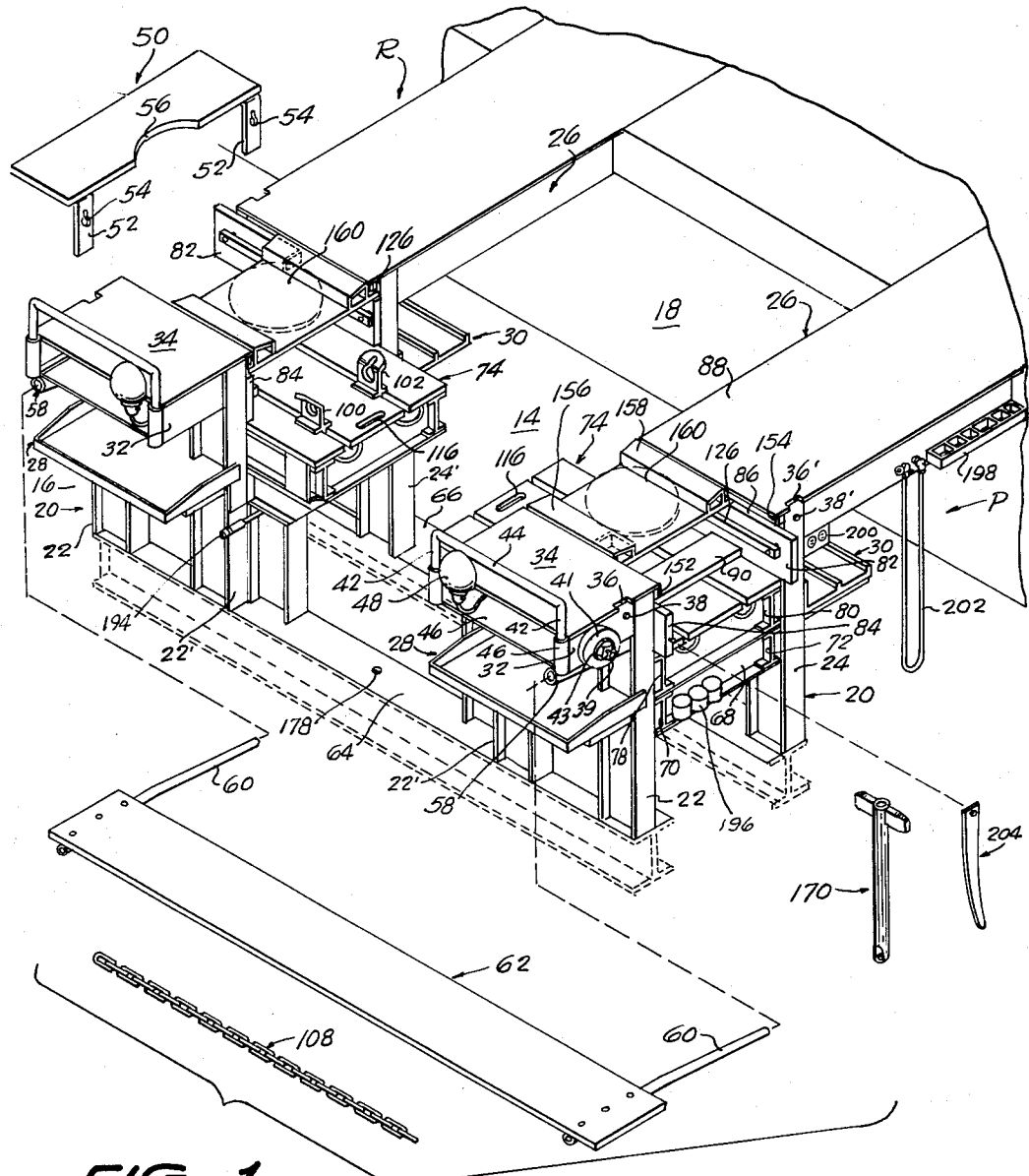
FIGURE 1 is an exploded perspective view of a rack in accordance with the present invention, certain of its convenience accessories being shown removed from the rack.
Figure 2:
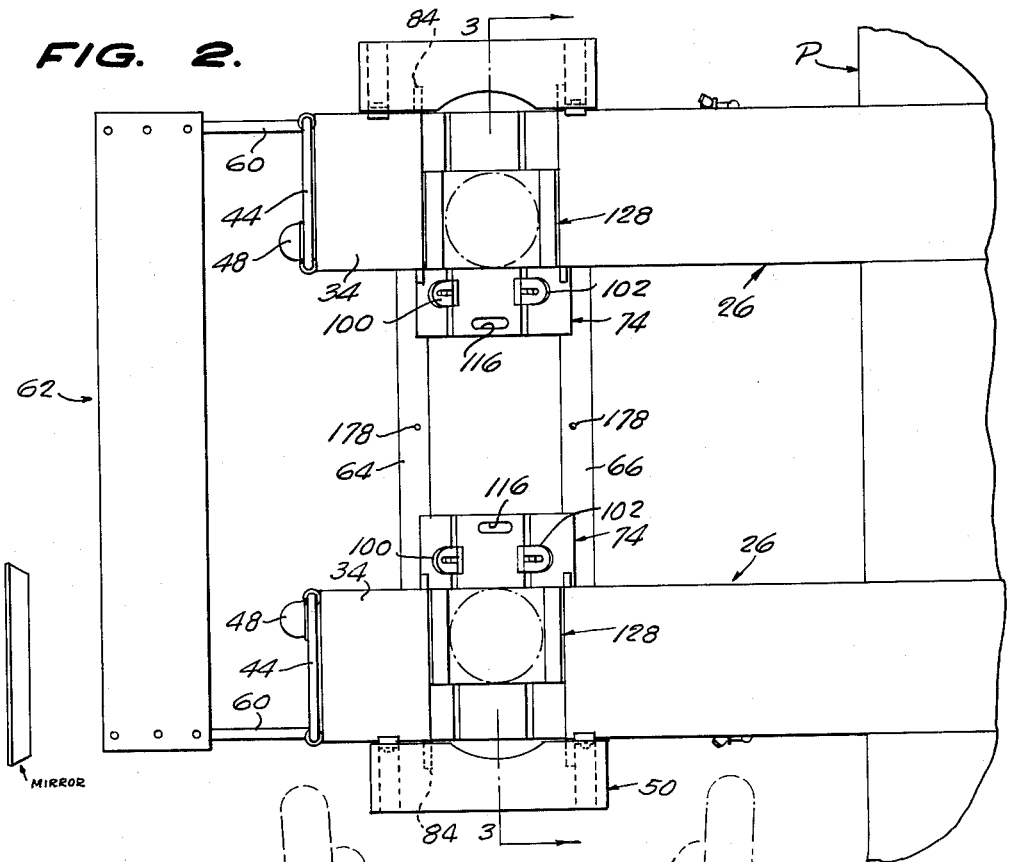
FIGURE 2 is a top plan view of FIGURE 1, showing a standing platform attached to the front of the rack, and side standing platforms attached to either side of the rack, and the press beam sections in separated or retracted position.
Figure 3:
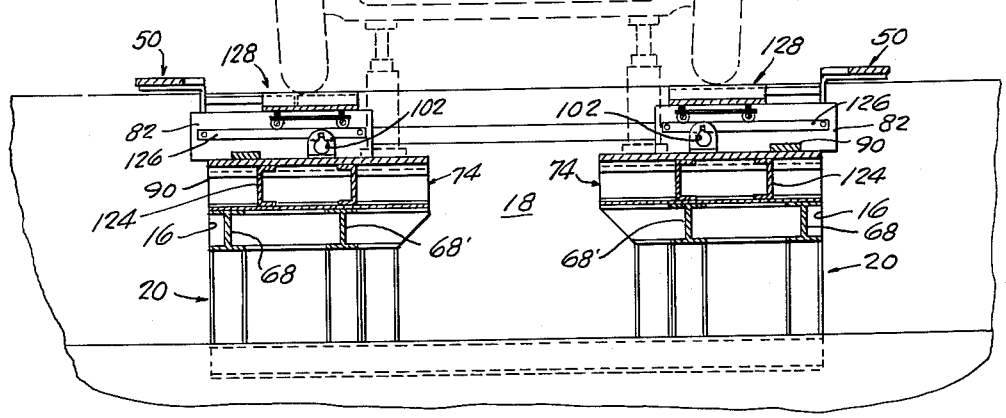
FIGURE 3 is a transverse vertical section taken on the line 3—3 of FIGURE 2 showing, in phantom lines, jacks on the press beam section and applied to the front axle of a vehicle.

Referring in detail to the drawings, P generally designates a concrete pit having a floor 14, side walls 16, and a back wall 18. The pit P is herein shown to be the short type, but the rack R mounted therein can be accommodated to a full length pit simply by lengthening its runway and providing adequate supports for the rear end thereof. This long type rack can also be used on a floor without the pit by providing a ramp.

The rack R comprises two substantially identical laterally spaced stands 20, each of which comprises a pair of parallel and laterally spaced front and rear outer and inner uprights 22 and 24, and 22' and 24', respectively. The forward ends of similar rearwardly extending runways 26 of inverted channel form, are suitably fixed to the rear uprights 24 and 24', of each stand 20, and have their rear ends embedded in the concrete of the back wall 18 of the pit P. Front tool shelves 28 are suitably fixed to the front stand uprights 22 and 22', at midheight points. Rear tool shelves 30 are suitably fixed to the rear stand uprights 24 and 24'.

Forwardly extending arms 32 are suitably fixed to the front uprights 22, 22' of the stands 20, at the upper ends thereof, and horizontal top plates 34 are fixed upon the upper edges of the arms and upon the upper ends of these uprights, and extend laterally outwardly from the outer arms and have notches 36 on their outer edges, which expose studs 38, which project outwardly from the outer arms. At their forward ends, the arms 32 are formed with vertical sockets 40, which receive the pendant legs 42 of transverse stop bars 44, which are spaced above the plates 34. Tool shelves 46 extend between and are fixed to the lower edges of the arms 32. Electric work illuminating lamps 48 are suitably mounted to the front edges of the plates 34.

The notches 36 and studs 38 are duplicated on the outer sides of the runways 26, as indicated at 36' and 38', respectively, for the purpose of removably mounting side standing platforms 50, which have spaced pendant flat legs 52 which engage in the notches, and have keyhole openings 54 for receiving the studs. Clearance notches 56 are formed in the inner edges of the platform 50.

Forward opening horizontal sockets 58 are secured to the undersides of the outer arms 32 of the stands 20 and are rearwardly and downwardly angled, as shown in FIGURE 5, and are adapted to removably receive the similarly angled legs 60 of a front standing platform 62.

Gauge-checking disc 41 is rigidly secured to the outer arm 32 of the left side only, held in place by a lateral bolt 39, with a castle nut 43. The disc 41 has divergent opposite faces provided for perfect plumb outer face installation, said outer face to be used as a permanent gauge-checking device, for the gauges that are used together with this rack.

The uprights of the stands 20 rest upon and are suitably fixed to front and rear beams 64 and 66, respectively, which are embedded flush, in the floor 14 of the pit P. The stands further comprise horizontal longitudinal arm members 68 and 68', which extend between the outer uprights 22 and 24, and inner uprights 22' and 24' and also the lower transverse horizontal front and rear members 70 and 72 at midheight point, which in turn are suitably fixed to the facing sides of the front uprights 22 and 22' and rear stand uprights 24 and 24'. The tops of the transverse members 70 and 72 constitute slidable supports for the similar sections of a press beam 74. As shown in FIGURE 4, the lower transverse members 70 and 72 extend inwardly beyond the stands 20. Upper front and rear transverse members 84 and 82 are fixed to the facing sides of the front and rear stand uprights, above the lower transverse members 70 and 72 leaving space for press beam section 74 to slide between the uppers and the lowers. These transverse members 84 and 82, respectively, are fixed to the facing sides of related uprights and extend across the front end of the runways 26, and have upper edges 86, which are spaced below the upper surfaces 88 of the runways. Reinforcement plates 90 extend between and are suitably fixed to the upper transverse members 82 and 84, at the lower edges thereof.

The press beam sections 74 comprise top plates 92 which are transversely elongated and are formed with parallel spaced longitudinal slots 94, which, as shown in FIGURE 10, are underlaid by downwardly spaced arcuate bridges 96, the slots 94 being open at their ends. The slots 94 and the bridges 96 receive the headed shanks 98 of front and rear slidable chain anchors 100 and 102. These anchors have bearing collars 104 resting upon the upper surfaces of the top plates 92, as shown in FIGURE 5, and apertured ears 106, on their upper ends, which are oppositely angled. The free ends of chains 108 are adapted to be secured through the apertured ears 106, after being passed over the work, such as vehicle axle 110, with the front wheels 112 of the vehicle resting upon selected gauges, not shown, supported upon gauge carriages, hereinafter described in detail.

The press beam sections 74 are substantially wider than is usual, in order to provide for supporting jacks farther forward and back than usual, for operations involving portions of running gear forward and behind the axes of vehicle front wheels.

The press beam sections 74 have hand hold slots 116, at their inner ends, which facilitate sliding them to desired positions. The sections 74 further comprise front and rear pendant I-beam rails 118 and 120 which have lateral flanges 122, along their lower edges, which slide upon the lower transverse members 70 and 72, and which are braced, back from their ends, by cross members 124.

The front and rear upper transverse members 82 and 84 have horizontal, transversely elongated tracks 126 affixed to their facing sides, at midheight level, upon which gauge carriages 128 roll. The gauge carriages, which are of substantially narrower width than the runways 26, comprise, as shown in detail in FIGURES 6 to 9, lower carrier framework 130 including longitudinally spaced brackets 132, which have spaced sleeves 133 at their ends, through which shafts 134 are journaled, which have rollers 136, on their ends, which roll upon the upper surfaces of the tracks 126. Bolts 138, having heads 140, on their lower ends, extend slidably and upwardly through holes 142 located isometrically in the brackets 132 of the lower carrier framework 130, at the corners of the latter, and coil springs 144 are circumposed upon the bolts and are compressed between the lower carrier framework 130, and floating plates 146, into which the upper ends of the bolts are threaded, as indicated at 148.

The upper carriage plates 146 are wider than the lower carrier framework 130, and, as shown in FIGURE 8, have upstanding ribs 150, along their front and rear edges, which severally are positioned behind pendant dirt guard flanges 152 and 154, on the rear edge of the stand top plates 34, and on the front ends of the runways 26, respectively.

The spring suspension of the top plates 146 of the carriages 128, provides a self-braking action when the weight of front vehicle wheels are imposed upon the top plates. This weight depresses the top plates 146, so that the top plates come to rest upon and are in heavy frictional engagement with the upper surfaces of the upper transverse members 82 and 84, whereby the carriages become securely held in the positions the carriages were adjusted to, in order to accommodate them to the spacing of the front wheels of the particular vehicle being serviced. When the car weight compresses the springs, then instead of the weight being on the tracks 126, the weight is on the top surface of the upper transverse members 82 and 84. The only weight the tracks 126 carry is the weight of the carriages and the gauges atop of them.

Oppositely angled and parallel spaced transverse front and rear inverted channel bridges 156 and 158, respectively, are fixed upon the top plates 146 for bridging the gaps between the top surfaces of the rotary turntables 160 on the center of the carriage 128, and the top surfaces of the runway 26 to the rear, and the top surface of the runway extension 34 on the front. It is to be noted that such gauges 160 in phantom form no part of the present invention and for this reason are not illustrated in the drawings.

An alternative form of carriage top plate 146a is shown in FIGURE 12, which has, instead of bridges, a front cross member 162 and a rear cross member 164. The front arm member 162 is kerfed to provide, with the upper surface of the top plate 146a, a transverse rearwardly opening slot 166. The rear cross member 164 is cut down, along its rear side, to provide a convex transversely extending rest 168. This construction provides for the seating and retention of a different form of gauge (not shown) having a turntable 160a.

As shown in FIGURES 4, 5 and 10, when certain infrequent front end correction operations are to be performed, which require a substantially unitary full length press beam extending between the stands 20, the beam sections 74 are moved inwardly into abutting relation, wherein they are supported by similar front and rear removable standards 170.

The standards 170 are tubular and are closed, at their lower ends, by walls 172 formed with central openings 179, through which bolts 176 extend, and are adapted to be threaded down in threaded openings 178 provided at the midlength points of the pit bottom beams 64 and 66, midway between the stands 20. Openings 179 in the sidewalls of the standards provide for access to the bolts 176. At their upper ends, the standards 170 are formed with coplanar vertical and diametrically opposed flag lugs 180 which are engageable between the webs 182 of the front and rear rails 118, 120 of the beam sections 74, and short retainer plates 184, fixed to the related edges of the top plates 92 of the sections 74 and lateral flanges 186, at the lower ends of the webs, and are sunken flush with the outer edges of press beams 74. These engagements are achieved simply by moving the sections 74, one at a time, so that related lugs 180 of the standards are received into position, with the upper ends 188 of the standards and the upper edges 190 of the lugs 180 supportively engaged with the undersides of the exposed upper flanges 192, on the webs 182.

Various convenience accessories can be installed on the rack R, such as a valved air pressure outlet 194, mounted on the front of the stands 20, cotter pin cups 196 on the outer sides of the stands, shim cups 198 along the outer sides of the runways 26, along with electrical outlets 200, and tire-inflating hoses 202, and a wheel hub cap remover 204.

Although there has been shown and described a preferred form of the invention, it is to be understood that the invention is not necessarily confined thereto, and that any changes or change in the structure of and in the relative arrangements of components thereof are contemplated as being within the scope of the invention as defined by the claims appended hereto.

What is claimed is:

1. In combination, a pit having a floor, a back wall and sidewall, said floor being spaced downwardly from a pavement, a pair of laterally spaced stands supported on and rising from the floor and spaced forwardly from said back wall, horizontal runways aligned with the stands, said runways having front ends fixed to the rear sides of the stands and rear ends supported on the back wall with their upper surfaces substantially flush with the pavement, facing cooperating tracks carried by and extending transversely across each stand, vehicle wheel gauge supporting carriages rollably supported on the tracks of each stand, a press beam composed of a pair of similar sections, the sections being slidably mounted on related stands below the carriages for movement crosswise of the stands, between retracted position in spaced relation to each other to extended abutting relationship, and a slidable chain anchor rising from each of the beam sections for attachment of a chain thereto.

2. The combination according to claim 1, which includes in addition a floating plate carried by each of the carriages.

3. The combination according to claim 2, wherein each floating plate is connected to the adjacent carriage by compressible coil spring means.

4. In combination, a pit having a floor, a back wall, and sidewall, said floor being spaced downwardly from a pavement, a pair of laterally spaced stands supported on and rising from the floor and spaced forwardly from said back wall, horizontal runways aligned with the stands, said runways having front ends fixed to the rear sides of the stands and rear ends supported on the back wall with their upper surfaces substantially flush with the pavement, and vehicle wheel gauge supporting carriages mounted on the stands for movements crosswise of and to either side of the runways, and a press beam composed of a pair of similar sections, the sections being slidably mounted on related stands below the carriages for movement crosswise of the stands, between retracted position in spaced relation to each other to extended abutting relationship, said stands comprising spaced front and rear upright means, cross members fixed to the facing sides of the front and rear upright means, said press beam sections comprising top plates having pendant rails riding upon said cross members, front and rear vertical members severally fixed to the rear side of the front upright means and to the forward side of the rear upright means below the upper surfaces of the runways, horizontal tracks extending along the facing sides of said members, carriages having rollers rolling upon the upper surfaces of the tracks, said carriages comprising lower plates carrying the rollers, upper plates overlying the lower plates, vertical bolts fixed to the upper plates and sliding through the lower plates, said bolts having heads normally engaged with the undersides of the lower plates, coil springs on the bolts and compressed between the upper and lower plates and normally elevating the upper plates above the lower plates, said upper plates having edge portions extending beyond related edges of the lower plates and overlying and spaced above said tracks and spaced above the upper vertical transverse members, downward pressure of vehicle wheels on the upper plates serving to depress said upper plates and frictionally engage said edge portions with the upper surfaces of the vertical transverse members for holding adjusted positions of the carriages relative to the stands and to the runways.

5. In combination, a pit having a floor, a back wall, a sidewall, said floor being spaced downwardly from a pavement, a pair of laterally spaced stands supported on and rising from the floor and spaced forwardly from said back wall, horizontal runways aligned with the stands, said runways having front ends fixed to the rear sides of the stands and rear ends supported on the back wall with their upper surfaces substantially flush with the pavement, and vehicle wheel gauge supporting carriages mounted on the stands for movement crosswise of and to either side of the runways, and a press beam composed of a pair of similar sections, the sections being slidably mounted on related stands below the carriages for movement crosswise of the stands, between retracted positions in spaced relation to each other to extended abutting relationship, said stands comprising spaced front and rear upright means, cross members fixed to the facing sides of the front and rear upright means, said press beam sections comprising top plates having pendant rails riding upon said cross members, front and rear vertical transverse members severally fixed to the rear side of the front upright means and to the forward side of the rear upright means below the upper surfaces of the runways, horizontal tracks extending along the facing sides of the transverse members, said carriages having rollers rolling upon the upper surfaces of the tracks, said carriages comprising lower carrier frameworks carrying the rollers, upper plates overlying the frameworks, vertical bolts fixed to the upper plates and sliding through the frameworks, said bolts having heads normally engaged with the undersides of the frameworks, coil springs on the bolts and compressed between the upper plates and the frameworks and normally elevating the upper plates above the frameworks, said upper plates having edge portions extending beyond related edges of the frameworks and overlying and spaced above said tracks and said upper vertical transverse members, downward pressure of vehicle wheels on the upper plates serving to depress said upper plates and frictionally engage said edge portions with the upper surfaces of the upper transverse vertical members for holding adjusted positions of the carriages relative to the stands and to the runways on the upper plates said top plates having transverse upstanding ribs and said front upright means and the runways having pendant transverse dirt guard flanges behind which said ribs are positioned.

6. In combination, a pit having a floor, a back wall, and side wall, said floor being spaced downwardly from a pavement, a pair of laterally spaced stands supported on and rising from the floor and spaced forwardly from said back wall, horizontal runways aligned with the stands, said runways having front ends fixed to the rear sides of the stands and rear ends supported on the back wall with their upper surfaces substantially flush with the pavement, and vehicle wheel gauge supporting carriages mounted on the stands for movements crosswise of and to either side of the runways, and a press beam composed of a pair of similar sections, the sections being slidably mounted on related stands below the carriages for movement crosswise of the stands, between retracted position in spaced relation to each other to extend abutting relationship, said stands comprising spaced front and rear upright means, cross members fixed to the facing sides of the front and rear upright means, said press beam sections comprising top plates having pendant rails riding upon said cross members, front and rear vertical transverse members severally fixed to the rear side of the front upright means and to the forward side of the rear upright means below the upper surfaces of the runways, horizontal tracks extending along the facing sides of said members, said carriages having rollers rolling upon the upper surfaces of the tracks, said carriages comprising frameworks carrying the rollers, upper plates overlying the frameworks, vertical bolts fixed to the upper plates and sliding through the frameworks, said bolts having heads normally engaged with the undersides of the frameworks, coil springs on the bolts and compressed between the upper plates and the frameworks and normally elevating the upper plates above the frameworks, said upper plates having edge portions extending beyond related edges of the frameworks and overlying and spaced above said tracks and above the vertical transverse members, downward pressure of vehicle wheels on the upper plates serving to depress said upper plates and frictionally engage said edge portions with the upper surfaces of the transverse members for holding adjusted positions of the carriages relative to the stands and to the runways, said carriage upper plates having spaced transverse bridges fixed on their upper surfaces, said bridges having oppositely angled upper surfaces, the upper surfaces of the upper plates between the bridges being adapted to support vehicle wheel gauges.

7. In combination, a pit having a floor, a back wall, and sidewall, said floor being spaced downwardly from a pavement, a pair of laterally spaced stands supported on and rising from the floor and spaced forwardly from said back wall, horizontal runways aligned with the stands, said runways having front ends fixed to the rear sides of the stands and rear ends supported on the back wall with their upper surfaces substantially flush with the pavement, and vehicle wheel gauge supporting carriages mounted on the stands for movements crosswise of and to either side of the runways, and a press beam composed of a pair of similar sections, the sections being slidably mounted on related stands below the carriages for movement crosswise of the stands, between retracted position in spaced relation to each other to extended abutting relationship, said stands comprising spaced front and rear upright means, cross members fixed to the facing sides of the front and rear upright means, said press beam sections comprising top plates having pendant rails riding upon said cross members, front and rear vertical transverse members severally fixed to the rear side of the front upright means and to the forward side of the rear upright means below the upper surfaces of the runways, horizontal tracks extending along the facing sides of the said members, said carriages having rollers rolling upon the upper surfaces of the tracks, said carriages comprising frameworks carrying the rollers, upper plates overlying the frameworks, vertical bolts fixed to the upper plates and sliding through the frameworks, said bolts having heads normally engaged with the undersides of the frameworks, coil springs on the bolts and compressed between the upper plates and the frameworks, said upper plates having edge portions extending beyond related edges of the frameworks and overlying and spaced above said tracks and above the vertical transverse members, downward pressure of vehicle wheels on the upper plates serving to depress said upper plates and frictionally engage said edge portions with the upper surfaces of the transverse members for holding adjusted positions of the carriages relative to the stands and to the runways, said carriage upper plates having spaced front and rear cross members upstanding thereon, said front cross member having a longitudinal rearwardly opening slot and said rear cross member being cut down along its front side to define a convex rest, portions of vehicle wheel gauges being adapted to be engaged in the slot and rested upon the rest.

References Cited by the Examiner
UNITED STATES PATENTS

| | | | |
|---|---|---|---|
| 2,140,686 | 12/1938 | Bennett | 72—705 |
| 2,348,697 | 5/1944 | Smith | 72—389 |
| 2,445,397 | 7/1948 | Horton | 72—457 |
| 2,491,117 | 12/1949 | Langham | 72—705 |
| 2,645,267 | 7/1953 | Elam | 72—705 |

CHARLES W. LANHAM, *Primary Examiner.*

RICHARD J. HERBST, *Examiner.*

L. A. LARSON, *Assistant Examiner.*